(No Model.) 7 Sheets—Sheet 5.
H. AIKEN.
BILLET CONVEYER.
No. 549,839. Patented Nov. 12, 1895.
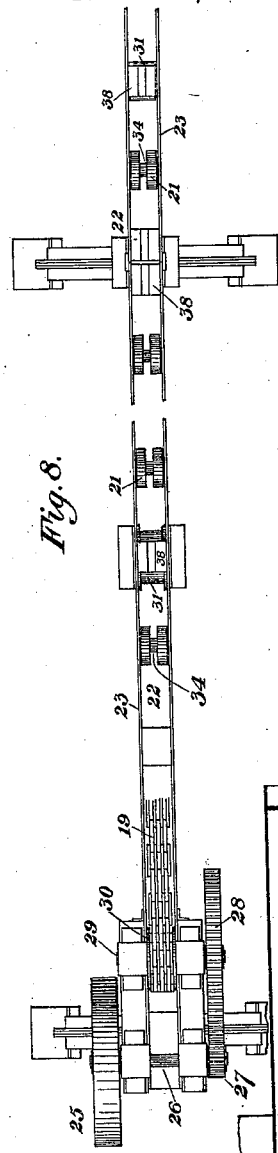
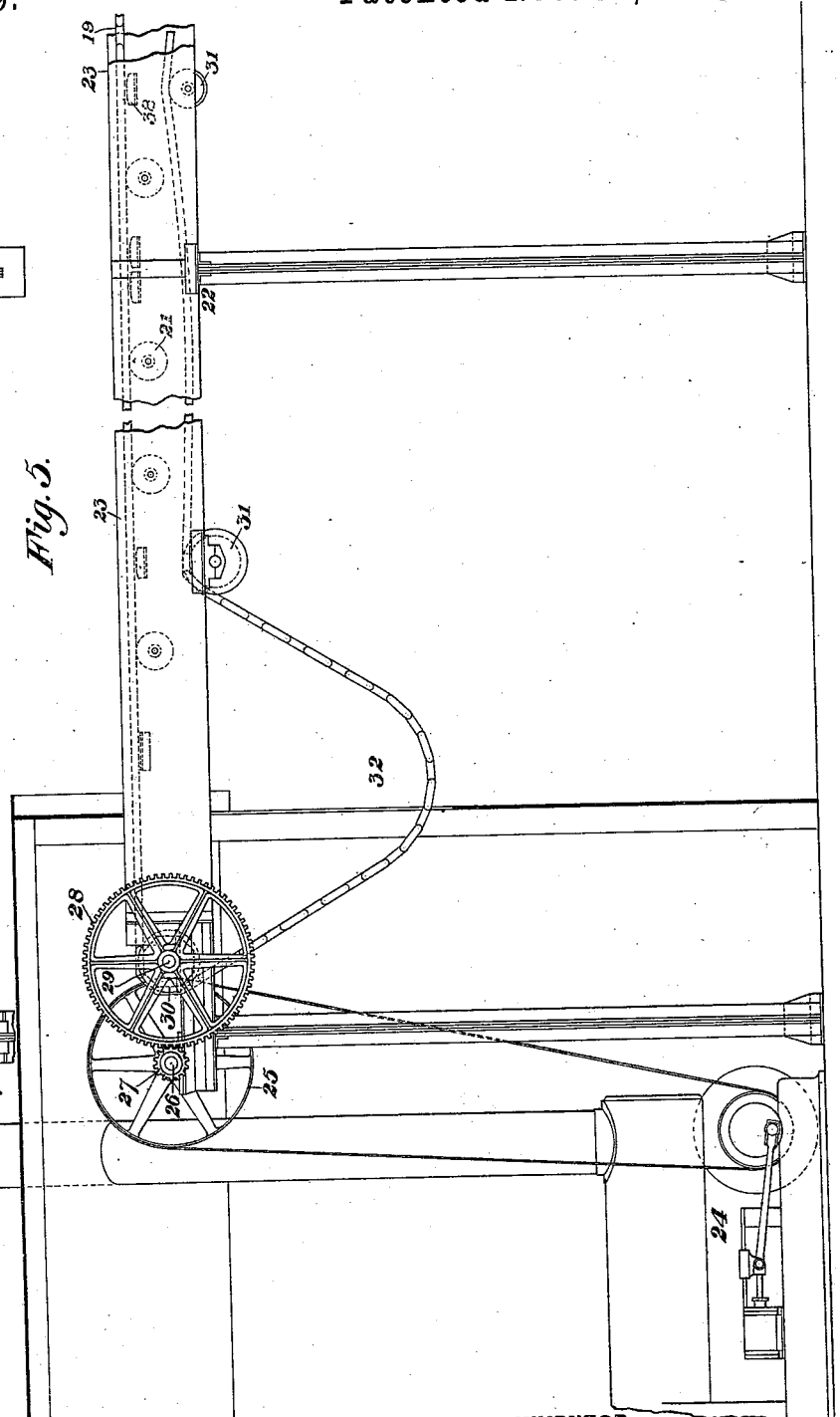
WITNESSES
Thomas W. Bakewell
N. L. Gill
INVENTOR
Henry Aiken (No Model.) 7 Sheets—Sheet 6.

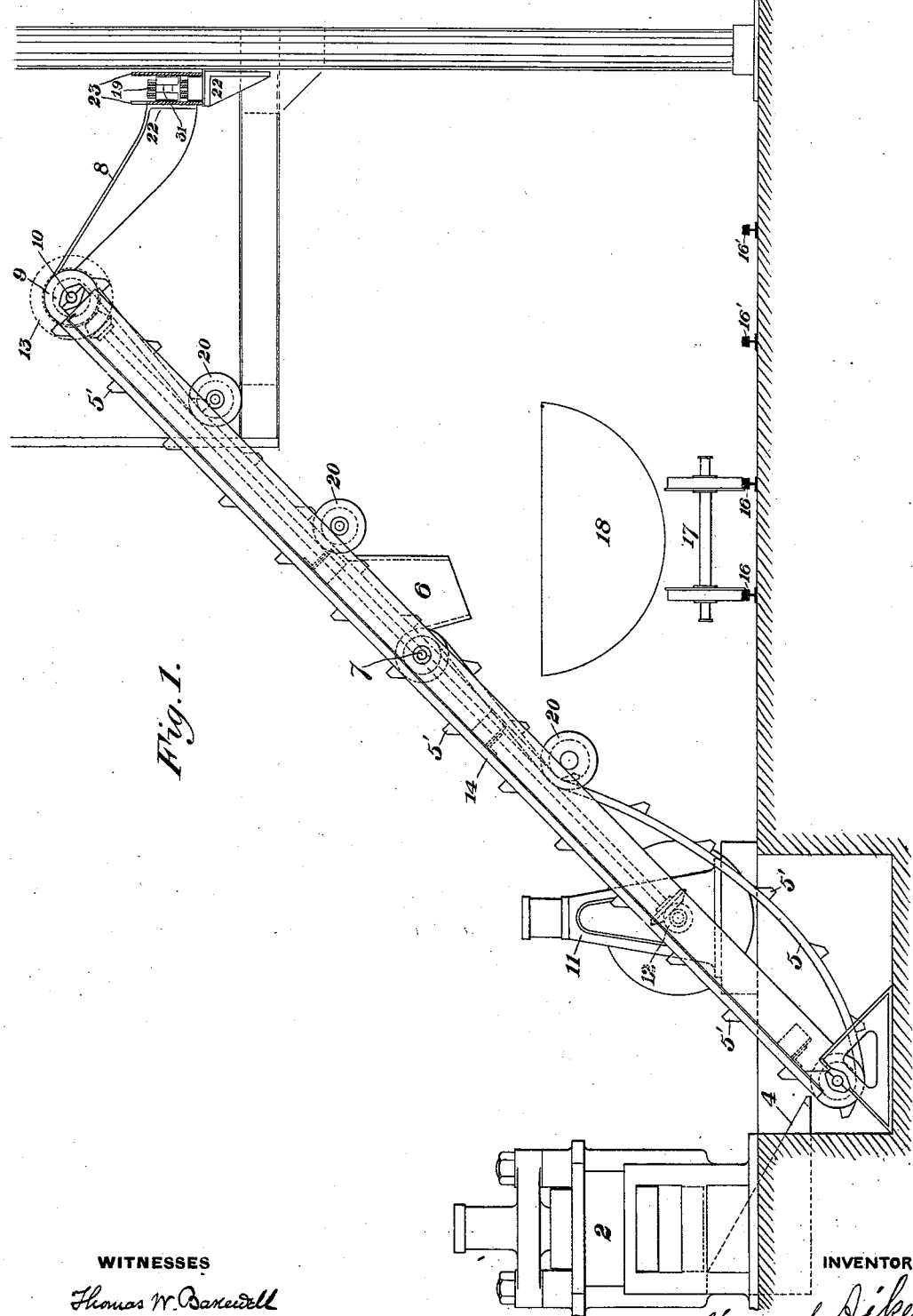

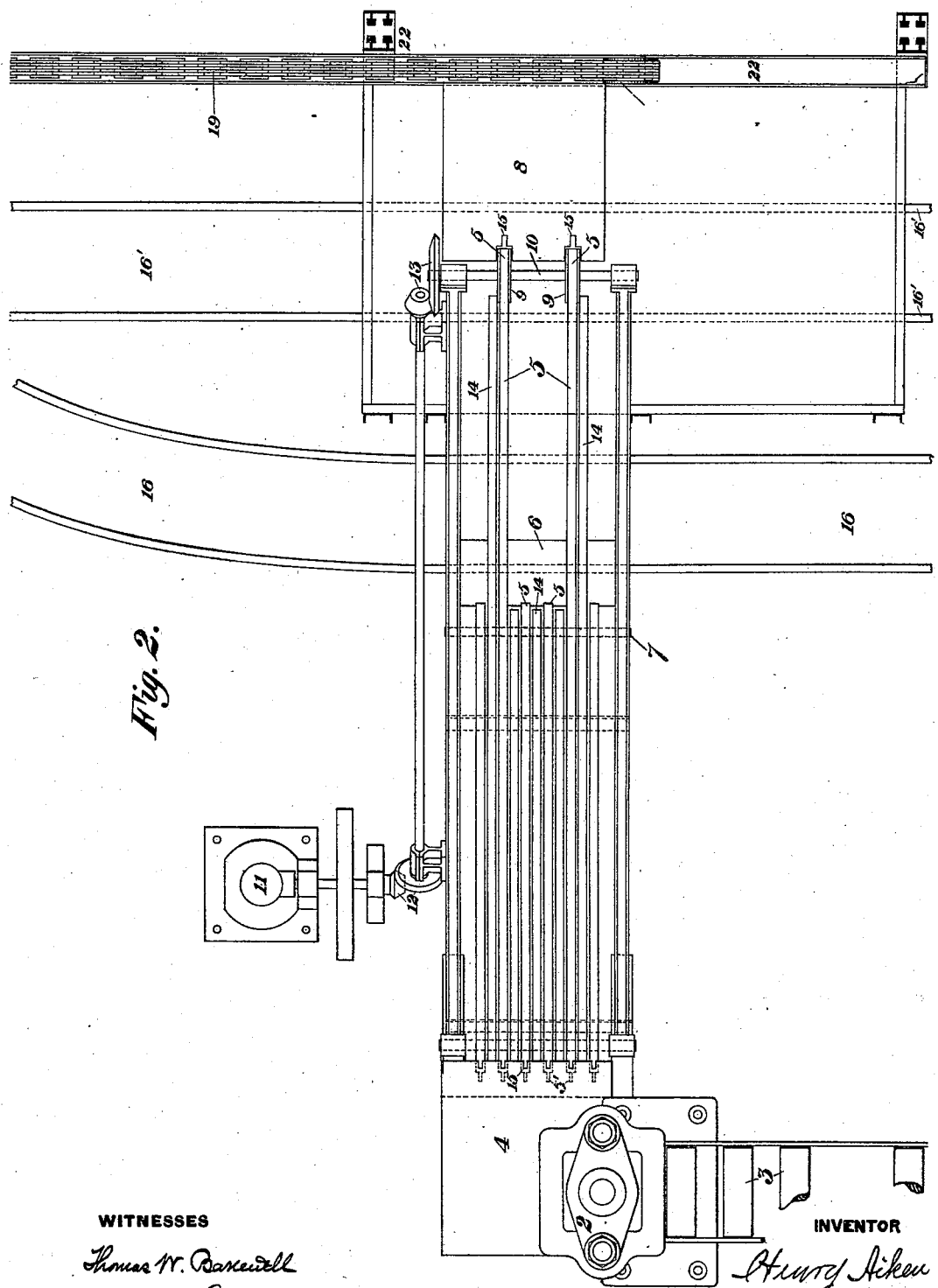

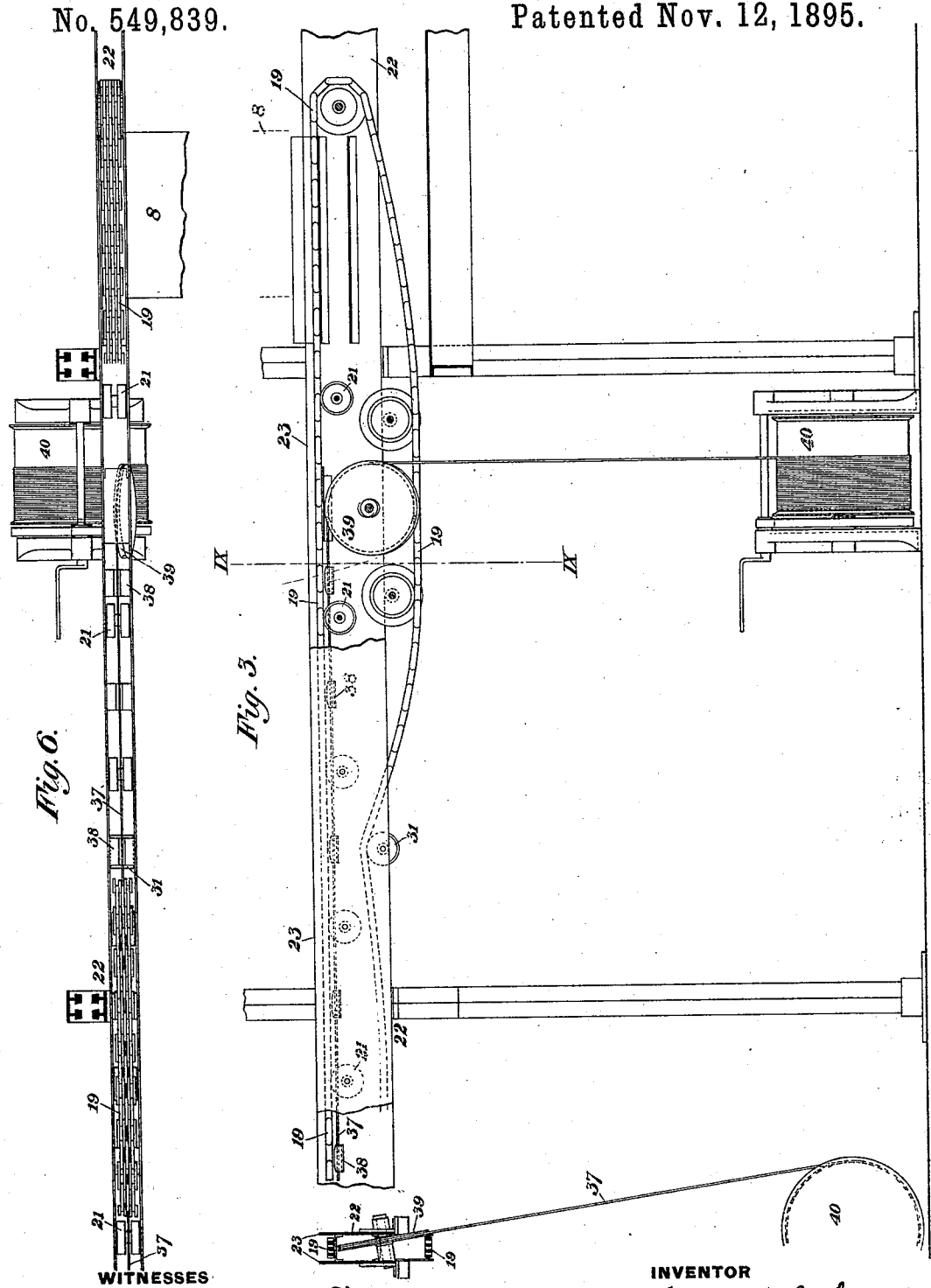

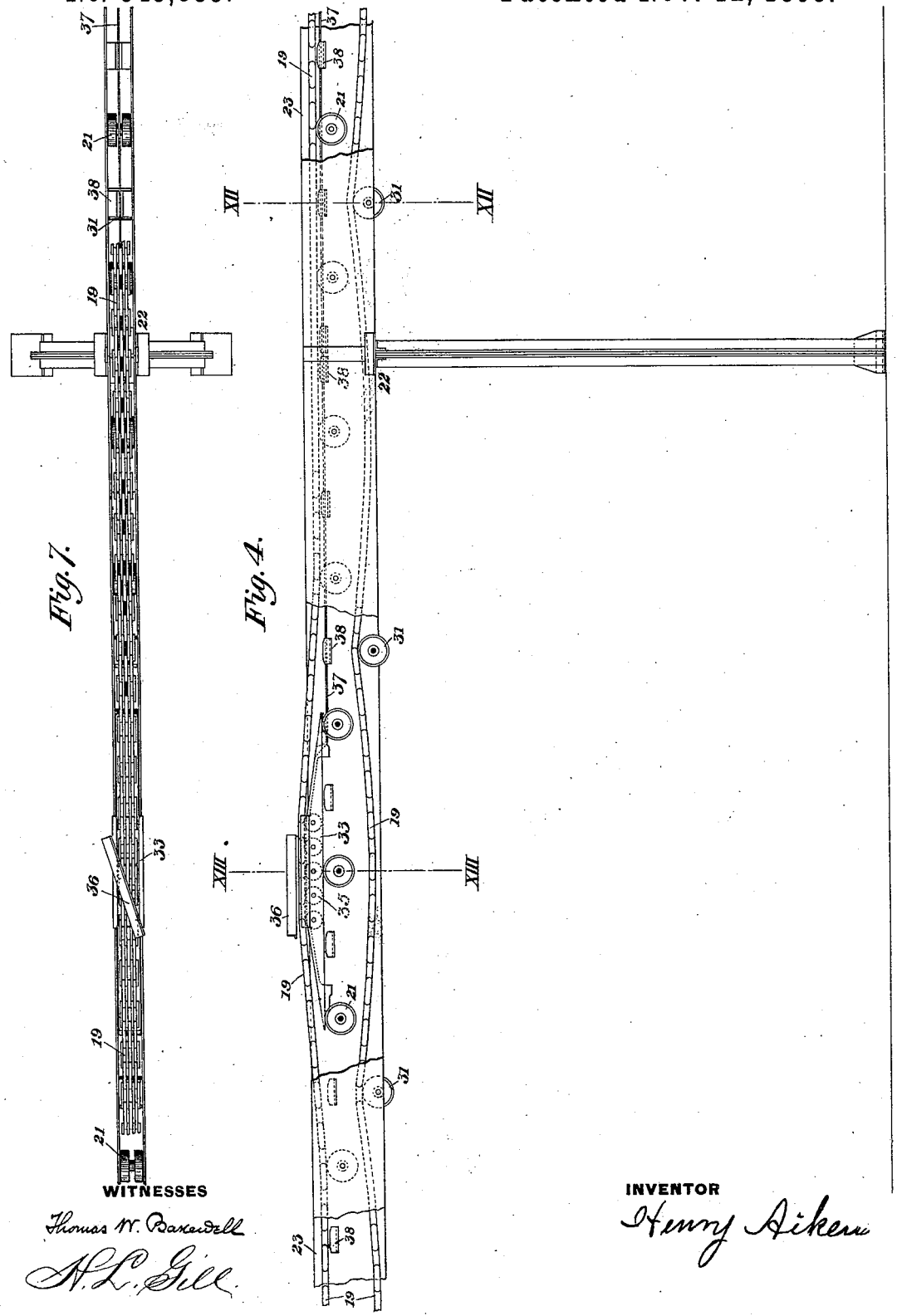

H. AIKEN.
BILLET CONVEYER.

No. 549,839. Patented Nov. 12, 1895.

WITNESSES
Thomas W. Bakewell
N. L. Gill

INVENTOR
Henry Aiken (No Model.) 7 Sheets—Sheet 7.
H. AIKEN.
BILLET CONVEYER.
No. 549,839. Patented Nov. 12, 1895.
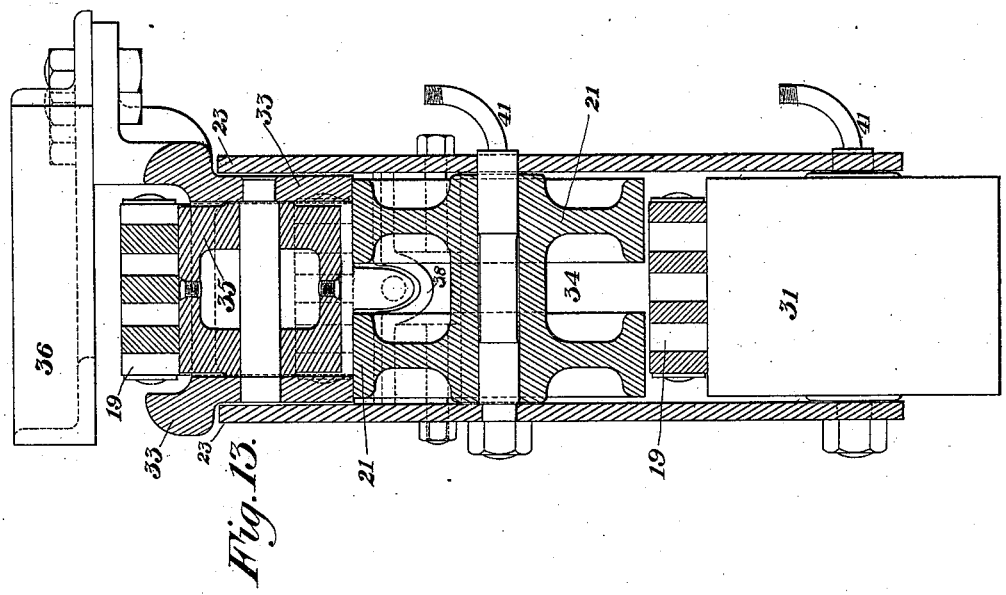
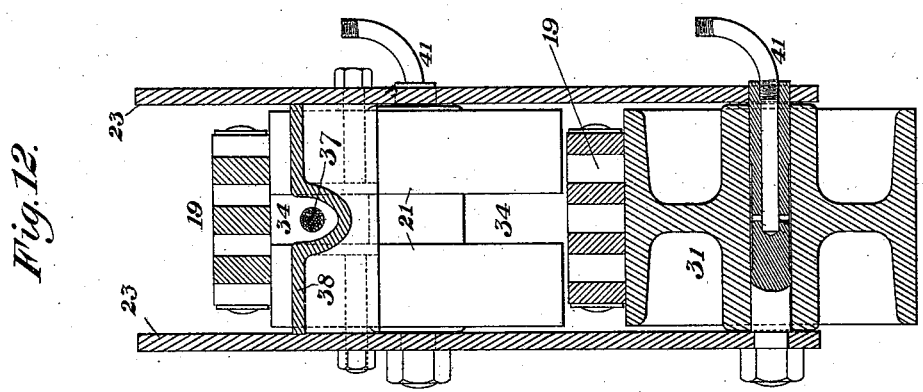
WITNESSES
Thomas W. Bakewell
N. L. Gill
INVENTOR
Henry Aiken

UNITED STATES PATENT OFFICE.

HENRY AIKEN, OF PITTSBURG, PENNSYLVANIA.

BILLET-CONVEYER.

SPECIFICATION forming part of Letters Patent No. 549,839, dated November 12, 1895.

Application filed January 11, 1892. Serial No. 417,771. (No model.)

*To all whom it may concern:*

Be it known that I, HENRY AIKEN, of Pittsburg, in the county of Allegheny and State of Pennsylvania, have invented a new and useful Improvement in Billet-Conveyers, of which the following is a full, clear, and exact description, reference being had to the accompanying drawings, forming part of this specification, in which—

Figure 10:
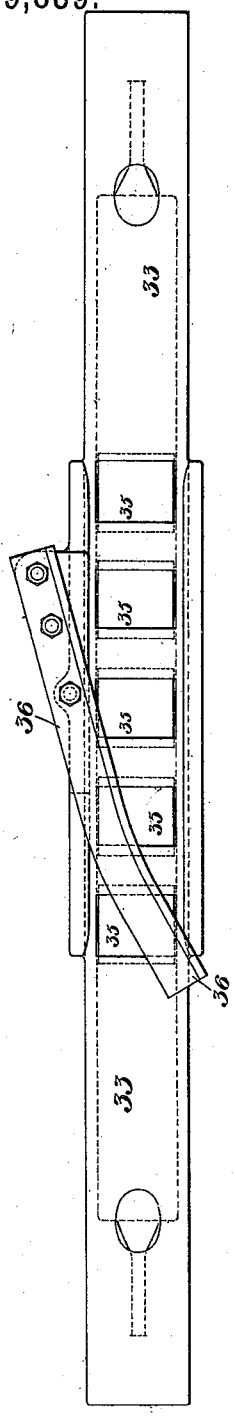
Figure 11:
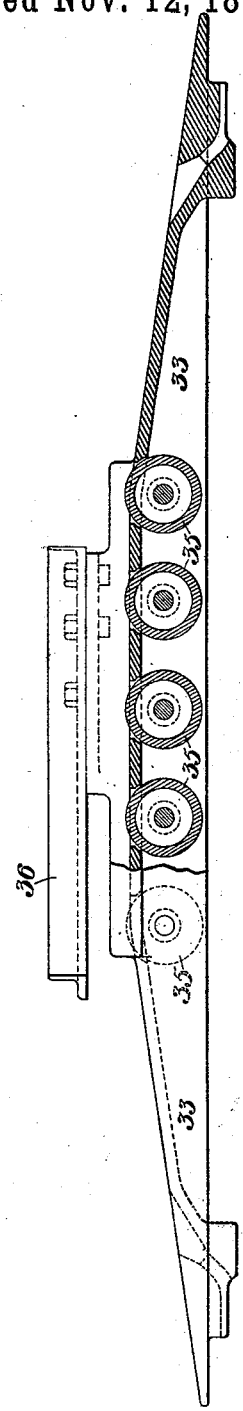

Figure 1 is an end elevation of my improved billet-conveying mechanism. Fig. 2 is a top plan view of the same end portion. Figs. 3, 4, and 5 are side elevations, partly broken away, of different portions of the horizontal endless conveying-chain, Fig. 3 illustrating the end portions shown in Figs. 1 and 2, Fig. 4 the middle portion, and Fig. 5 the outer end portion. Figs. 6, 7, and 8 are corresponding top plan views of the same portions of the conveyer. Fig. 9 is a cross-sectional view on the line IX IX of Fig. 3. Fig. 10 is a top plan view of the billet deflector or switch. Fig. 11 is a side elevation, partly in vertical section, of the same. Fig. 12 is a cross-section on the line XII XII of Fig. 4, and Fig. 13 is a cross-sectional view on the line XIII XIII of Fig. 4.

Like symbols of reference indicate like parts in each view.

My invention relates more especially to those mechanisms employed in rolling-mills for lifting and conveying billets from the shears to another place or places and distributing them to the stock-piles for shipment.

In the drawings, 2 indicates metal billet-shears located at any suitable point in the mill and to which the metal to be cut is conveyed by suitable transfer-rolls 3 or otherwise. The metal being cut into billets of the desired lengths by the shears, passes therefrom onto the inclined delivery-chute 4, and sliding sidewise down the same is engaged and carried upwardly by the fingers or pawls 5' upon a series of parallel sprocket-chains 5. There are six of these chains shown, four of which lead to a point above a chute 6 and pass around sprocket-wheels upon a shaft 7. The two remaining chains are longer and lead to a level higher than that of the horizontal conveyer and discharge upon a second inclined chute 8. The longer chains are actuated by sprocket-wheels 9 upon a shaft 10, carried at the upper end of the conveyer, this shaft being actuated by a suitable engine 11 through intermediate gearing 12 and 13. These longer chains pass over sprocket-wheels upon the shaft 7 and thereby actuate the shorter chains, while between the chains there may be longitudinal bars 14, forming a bed upon which the billets are moved by the projecting fingers, or the bars may be omitted and the billets carried by the chains directly. Each inclined chute may be provided with a series of slots 15 to permit the passage of these fingers. Supporting-wheels 20 for the chains are provided at suitable distances apart and the slack of the chain is taken up at the under portion of their path, the power being applied at the upper end of each chain, thus keeping them taut on the upper lines. The chute 6 is immediately above a track 16, upon which moves a car 17, whose bed 18 receives the crop ends or short pieces of the billets, these being carried upward by the short chains and dropped into the chute through the gap between the longer chains, while the larger billets, being of greater length and extending from one longer chain to the other, rest upon these longer chains, and being carried thereby over the gap are delivered upon the chute 8, and sliding down the same are received upon the endless horizontal conveyer-chain 19.

The chain 19 passes through the mill to any suitable point within or outside the same and extends past the various points where it is desired to deposit the billets. It is carried upon sets of idle-wheels 21, supported in an elevated frame or conveyer-table 22, provided with side guards or rails 23, which confine and guide the metal billets as they are carried by the chain. An engine 24, located at the outer end of the chain, is connected with and serves to drive a pulley 25 upon the shaft 26. Upon this shaft is carried a pinion 27, which meshes with a gear-wheel 28 upon a shaft 29, carrying the sprocket-wheel 30. This wheel 30 serves to drive the chain, the lower line of which is carried upon the supporting idler-wheels 31, the slack being taken up at 32.

The switch is supported upon a carriage 33, resting upon the idle-wheels or rollers 21, as shown in Figs. 4 and 7. These upper idle-wheels 21 are provided with peripheral annular grooves 34, and upon the outer portions of the wheels rest the side pieces of the frame of the carriage 33, in which are journaled a series of rollers 35, over which the conveyer-chain 19 passes, Figs. 10, 11, and 13, and the carriage has also preferably inclined end pieces for the support of the chain. By thus passing over the carriage the chain 19 is at this point lifted above or up to the level of the top of the side guards of the conveyer-frame, thus elevating the billets and permitting them to be discharged from the conveyer by the switch. The switch proper consists of a diagonal strip 36, preferably of angle-iron, which is fastened to one of the side pieces of the top of the carriage and extends across the path of the conveyer-chain, forming a deflector by which the billets engaging the same are deflected and pushed from the chain and drop to one side of the same into a suitable receptacle or upon a stock-pile beneath the conveyer. To one end of the carriage is secured a wire rope 37, which extends therefrom through the grooves in the idle-wheels and through like grooves in the braces or cross-pieces 38, secured to the conveyer-frame between the wheels, over an inclined guide-pulley 39 and downwardly to a drum 40 or similar device upon which it may be wound or by which it may be pulled. The pulley 39 is supported at an angle to the vertical, as shown in Fig. 9, in order to clear the lower line of the endless chain, and any suitable locking mechanism, such as a pawl and ratchet, is provided for the drum 40. By the rope 37 the carriage may be drawn toward the pulley 39 to any portion of the conveyer, and as the enless conveyer-chain passing over the rollers 35 of the carriage tends in its motion to draw the carriage in the opposite direction toward the outer end of the conveyer, the carriage is held firmly in its desired position, and when the drum is unlocked will be carried back in the opposite direction by the frictional action of the chain.

The conveyer-chain, as shown, consists, preferably, of flat links joined by pins forming flat conveyer, upon which the billets are carried forward. Suitable oiling devices 41 are provided for lubricating the bearings of the idle-wheels, as shown in Figs. 12 and 13.

The operation of my device is as follows: The billets, being cut into suitable lengths by the shears, slide sidewise down the chute 4, and being engaged by the fingers upon the sprocket-chains 5, are carried upwardly and deposited upon the second chute 8, the short crop ends dropping at the chute 6 through the gap between the longer chains. Sliding down the chute 8, the billets are deposited upon the conveyer 19, lying longitudinally thereon, and are carried along by the same until they reach the point where it is desired to collect them, at which point the switch-carriage has been set, as before explained, where they are removed by engagement with the deflecting strip or switch and are pushed off the conveyer and caused to fall upon the receptacle or heap below. The crop ends being collected in the car 17 upon the side track, are removed at suitable intervals by the engine upon the main track 16', as shown in Figs. 1 and 2.

The advantages of my construction are numerous. By its agency the billets are separated from the crop ends, are automatically removed from the mill and deposited at any desired place in the yard without the necessity of any hand labor. The use of the movable switch is of value. In mill practice it is frequently necessary to separate certain lots of billets from others, either for the the purpose of filling special orders or for separating different grades of product. Where the metal is all deposited in a single heap, such separation is a work of difficulty, but by means of my improvement the separation and classification of the product is systematized and rendered easy.

The system is simple, has no parts liable to get out of order, and performs its work in an extremely efficient manner. It is evident that many changes may be made in the construction and arrangement of the various parts without departure from my invention.

I claim as my invention—

1. In transfer mechanism, the combination of a conveyer table, means for moving metal along the same, a switch or deflector situate above the moving mechanism of the table, and traction devices connected to the switch and arranged to move the same along the table and retain it in its adjusted position; substantially as described.

2. In transfer mechanism, a conveyer table having rollers journaled therein, an endless belt or chain passing over the rollers, a movable switch above the chain, and traction devices arranged to move the switch to different positions and retain it therein; substantially as described.

3. In transfer mechanism, the combination with an endless chain conveyer, of a frame for the conveyer having side guards to guide the pieces carried by the chain, a switch or deflector having a portion over which the chain passes and by which the chain is raised at the switch and is adapted to discharge the pieces over the guards; substantially as described.

4. In transfer mechanism, the combination with an endless chain conveyer, of a frame for the conveyer having side-guards to guide the pieces carried by the chain, a switch or deflector having a carriage over which the chain passes and by which the chain is raised at the carriage, and means for moving the carriage along the frame; substantially as described.

5. In transfer mechanism, the combination with an endless chain conveyer, of a frame for the conveyer having side-guards to guide the pieces carried by the chain, a switch or deflector having a carriage having rollers over which the chain passes and by which the chain is raised at the carriage, and means for moving the carriage along the frame; substantially as described.

6. In transfer mechanism, the combination with an endless chain conveyer, of a switch or deflector mounted in the conveyer-frame, side-guards for the conveyer-frame, and means for elevating the chain at the switch; substantially as described.

7. In transfer mechanism, the combination with an endless chain conveyer, of a switch or deflector mounted in the conveyer frame and provided with a movable carriage having inclined end portions over which the chain passes; substantially as described.

8. In transfer mechanism, the combination with an endless chain conveyer, of a switch or deflector mounted in the conveyer frame in contact with the chain which exerts frictional traction tending to move the switch or deflector in one direction, and a rope and drum for moving the same in the opposite direction; substantially as described.

9. In transfer mechanism, the combination with an endless chain conveyer, of a switch or deflector mounted in the conveyer-frame in contact with the chain which exerts frictional traction tending to move the switch or deflector in one direction, a rope for moving the same in the opposite direction, and an inclined sheave over which the rope passes; substantially as described.

In testimony whereof I have hereunto set my hand this 6th day of January, A. D. 1892.

HENRY AIKEN.

Witnesses:
W. B. CORWIN,
THOMAS W. BAKEWELL.